US011702801B2

(12) United States Patent
Murphy et al.

(10) Patent No.: US 11,702,801 B2
(45) Date of Patent: Jul. 18, 2023

(54) METHODS AND COMPOSITIONS FOR ASPHALT REJUVENATION

(71) Applicant: Owens Corning Intellectual Capital, LLC, Toledo, OH (US)

(72) Inventors: Timothy Murphy, Brownstown, MI (US); Courtney Rice, Tallahassee, FL (US); Jason Guerra, Tinley Park, IL (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 341 days.

(21) Appl. No.: 17/035,515

(22) Filed: Sep. 28, 2020

(65) Prior Publication Data

US 2021/0095429 A1 Apr. 1, 2021

Related U.S. Application Data

(60) Provisional application No. 62/908,052, filed on Sep. 30, 2019.

(51) Int. Cl.
*E01C 7/26* (2006.01)
*C08J 11/20* (2006.01)
*E01C 19/46* (2006.01)
*E01C 23/06* (2006.01)
*C08K 5/01* (2006.01)

(52) U.S. Cl.
CPC .............. *E01C 7/26* (2013.01); *C08J 11/20* (2013.01); *C08K 5/01* (2013.01); *E01C 19/463* (2013.01); *E01C 23/065* (2013.01); *C08J 2395/00* (2013.01)

(58) Field of Classification Search
CPC ........ E01C 7/26; E01C 19/463; E01C 23/065; C08J 11/20; C08J 2395/00; C08K 5/01
USPC ............................................ 404/17, 72, 75
See application file for complete search history.

(56) References Cited

U.S. PATENT DOCUMENTS

| | | | |
|---|---|---|---|
| 4,011,023 A | 3/1977 | Cutler | |
| 4,124,325 A | 11/1978 | Cutler | |
| 4,272,212 A | 6/1981 | Bauer et al. | |
| 5,938,130 A | 8/1999 | Zickell | |
| 6,290,152 B1 | 9/2001 | Zickell | |
| 6,695,530 B2 | 2/2004 | Crupi | |
| 6,769,836 B2 | 8/2004 | Lloyd | |
| 6,939,079 B2 | 9/2005 | Lloyd | |
| 7,077,601 B2 | 7/2006 | Lloyd | |
| 7,448,825 B2 | 11/2008 | Kasahara et al. | |
| 7,549,821 B2 | 6/2009 | Hall et al. | |
| 7,591,607 B2 | 9/2009 | Hall et al. | |
| 8,133,316 B2 * | 3/2012 | Poncelet | E01C 19/1036 366/14 |
| 9,322,138 B2 | 4/2016 | Villalobos Davila | |
| 9,492,946 B2 | 11/2016 | Meeker et al. | |
| 9,745,472 B2 | 8/2017 | Salmonsen et al. | |
| 9,790,360 B2 | 10/2017 | Puchalski et al. | |
| 9,863,101 B2 | 1/2018 | Mollick et al. | |
| 10,030,145 B2 | 7/2018 | Severance et al. | |
| 2010/0034586 A1 | 2/2010 | Bailey et al. | |
| 2010/0275817 A1 * | 11/2010 | Williams | C04B 26/26 106/246 |
| 2011/0294927 A1 * | 12/2011 | Williams | C08L 95/00 524/570 |
| 2013/0319289 A1 * | 12/2013 | Nevin | C08L 91/00 106/504 |
| 2017/0247542 A1 | 8/2017 | Williams et al. | |
| 2018/0044529 A1 * | 2/2018 | Kurth | C11C 3/00 |
| 2018/0080180 A1 | 3/2018 | Kurth et al. | |
| 2018/0265704 A1 | 9/2018 | Puchalski et al. | |
| 2019/0048191 A1 | 2/2019 | Gonzalez Leon et al. | |
| 2019/0100886 A1 | 4/2019 | Eliot | |

* cited by examiner

*Primary Examiner* — Raymond W Addie
(74) *Attorney, Agent, or Firm* — Calfee, Halter & Griswold LLP

(57) ABSTRACT

Roadway resurfacing often requires removal of the existing asphalt from the roadway for reuse. One method of resurfacing a roadway is hot-in-place recycling. Hot-in-place recycling employs substantial heat to remove the oxidized or aged asphalt. This heat further oxidizes the asphalt, creating a material that lacks many desirable properties (e.g., flowability) and flexibility. The disclosure provides compositions and methods that enhance oxidized asphalt, making it more viable for use in resurfacing roadways. Accordingly, compositions comprising recycled asphalt pavement and a rejuvenating agent are disclosed. The compositions combine a rejuvenator and fresh asphalt flux to make a modified asphalt rejuvenator. The modified rejuvenator is then mixed with recycled asphalt pavement to form a rejuvenated asphalt composition.

13 Claims, No Drawings

METHODS AND COMPOSITIONS FOR ASPHALT REJUVENATION

CROSS-REFERENCE TO RELATED APPLICATIONS

This application claims priority to and the benefit of U.S. Provisional Application No. 62/908,052, filed Sep. 30, 2019, the entire content of which is incorporated by reference herein.

FIELD

The general inventive concepts relate to asphalt paving and more particularly to methods and additive compositions for asphalt rejuvenation, including, but not limited to, hot-in-place asphalt rejuvenation.

BACKGROUND

Conventional asphalt roadways include an aggregate (often rocks/gravel) substrate blended with bitumen. The asphalt binds the aggregate, preventing it from being stripped off, and aids in providing a smoother surface for the roadway. While asphalt surfaces are generally very durable and can withstand a range of temperatures and climates, eventually the surfaces wear down and require replacement or additional (re)surfacing.

One method of resurfacing a roadway is to recycle the asphalt pavement currently in place and reuse it on the roadway. Reclaimed asphalt pavement (RAP) is typically limited, however, to use in limited amounts in asphalt base and surface layers. The usefulness of recycled material in the surface layers is limited because asphalt deteriorates with time; it loses flexibility, becomes oxidized and brittle, and tends to crack, particularly under stress or at low temperatures. These effects are primarily due to aging of the organic component of the asphalt, i.e., the components of the bitumen, particularly upon exposure to weather. The aged binder is also much more hard/brittle than "fresh" or virgin asphalt. Consequently, reclaimed asphalt pavement has different properties than virgin asphalt and making durable pavement comprising high amounts of RAP is difficult. Use of RAP in too great an amount leads to a shorter lifespan and, consequently, more frequent need for resurfacing.

Rejuvenating agents (also referred to as recycling agents) have been developed to increase the amount of reclaimed asphalt that can be incorporated in both the base and surface layers. Rejuvenating agents help to restore a portion of the recycled asphalt properties and liquid asphalt physical properties so that the reclaimed asphalt properties more closely resemble those of virgin asphalt. Improving the properties of RAP allows for increased amounts of RAP to be used in asphalt mixtures without compromising the performance and lifespan of the final pavement.

Therefore, a need exists for improved rejuvenating agents and methods of rejuvenating oxidized asphalt.

SUMMARY

The general inventive concepts are based, in part, on the discovery that certain rejuvenating agents can increase low(er) temperature flowability of recycled asphalt pavement (RAP). By producing a product that has greater flowability (i.e., lower viscosity), pavement can be produced using greater percentages of RAP and correspondingly less energy is required to heat the asphalt mixture prior to its application to a surface.

Hot-in-place recycling is a method of recycling existing asphalt in a roadway during resurfacing. The process often involves high heat in the removal of the existing road surface. This heat oxidizes the existing asphalt and further degrades the binders present in the asphalt. The conventional method of countering this unwanted oxidation is to add a "rejuvenator" to the asphalt mix. The rejuvenator serves to chemically revive the binders in the asphalt, making them suitable for use in the newly resurfaced roadway. This process does not introduce new binder into the system. However, conventional rejuvenators suffer from drawbacks for a variety of reasons including cost, water content, and tackiness of the road surface after completion, among others.

In certain exemplary embodiments, the general inventive concepts contemplate a novel formulation that combines a conventional rejuvenator with "virgin" asphalt flux. Such a formulation (re)activates the recycled asphalt binder and is flowable at room temperature. The addition of the asphalt flux provides added tackiness relative to formulations comprising rejuvenator alone.

In certain exemplary embodiments, the general inventive concepts contemplate a hot-in-place asphalt formulation which comprises a blend of 50-80% asphalt rejuvenator and 20-50% asphalt flux. The rejuvenator is selected from bio-based rejuvenators including e.g., corn-oil based, soy based, modified vegetable oil.

In certain exemplary embodiments, the general inventive concepts contemplate a method of resurfacing a roadway. The method comprises mixing a bio-based asphalt rejuvenator in an amount of 50-80% by weight with virgin asphalt flux in an amount of 20-50% by weight, to form a modified rejuvenator, acquiring recycled asphalt pavement, mixing the modified rejuvenator with the recycled asphalt pavement, and contacting the roadway with the mixture formed from the recycled asphalt pavement and modified rejuvenator.

DETAILED DESCRIPTION

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

Unless defined otherwise, all technical and scientific terms used herein have the same meaning as commonly understood by one of ordinary skill in the art to which the invention belongs. In this regard, unless otherwise indicated, concentrations of ingredients given in this document refer to the concentrations of these ingredients in the master batch, in keeping with customary practice.

The term "aggregate" as used herein, refers to particulate material suitable for use in asphalt. It generally comprises sand, gravel, crushed stone, and slag. Any conventional type of aggregate suitable for use in asphalt can be used. Examples of suitable aggregates include granite, limestone, gravel, and mixtures thereof.

The term "asphalt flux" as used herein, refers to a grade of liquid bitumen derived from crude oil that may be mixed with hard asphalt to lower the viscosity of the hard asphalt. Virgin asphalt flux refers to asphalt flux that has not been used previously for paving.

The term "binder" as used herein, refers to a combination of bitumen and, optionally, other components in an asphalt mixture that function to adhere the asphalt aggregate together into a uniform matrix.

The term "bitumen" as used herein, refers to a mixture of viscous organic liquids or semi-solids from crude oil composed primarily of condensed aromatic hydrocarbons. Bitumen may be any conventional type of asphalt known to the skilled person. The asphalt may be naturally occurring. It may be crude bitumen, or it may be refined bitumen obtained as the bottom residue from vacuum distillation of crude oil, thermal cracking, or hydrocracking. The bitumen contained in or obtained from reclaimed asphalt pavement is further referred to as bitumen of RAP origin. In certain embodiments, bitumen suitable for use according to the general inventive concepts refers to material having a performance grade (PG) of 58-34, a softening point between 80° F. and 110° F., 150 dmm penetration at 77° F. or higher, and/or an absolute viscosity of 50 to 200.

The term "reclaimed asphalt pavement" as used herein, refers to asphalt that has been used previously as pavement. RAP may be obtained from asphalt that has been removed from a road or other structure, and then has been processed by well-known methods, including milling, ripping, breaking, crushing, and/or pulverizing.

The term "oxidized asphalt" as used herein, refers to asphalt that is present in or is recovered from reclaimed asphalt.

The terms "rejuvenator" or "rejuvenating agent" are used interchangeably herein to refer to a composition or mixture that is combined with RAP (or mixtures with virgin asphalt) to revitalize the oxidized asphalt or RAP and restore some or all of the properties of the original virgin asphalt. In certain embodiments, a rejuvenator suitable for use according to the general inventive concepts is substantially free of water and/or has a flash point greater than 450° F.

The general inventive concepts relate to systems for and methods of resurfacing a roadway. Recycling of oxidized asphalt roadways provides savings in cost, time, hauling, and disposal fees over methods that do not reuse existing asphalt that must otherwise be lifted and removed during resurfacing. However, oxidized asphalt has several properties that make its integration into a new road surface challenging, including: higher viscosity, lower binding to aggregates, and higher heat of melting, among others. The general inventive concepts relate to compositions and methods that balance flowability of the rejuvenated hot mix asphalt while maintaining desired tackiness of the asphalt.

Hot-in-place asphalt recycling uses an asphalt milling process under added heat to grind existing asphalt pavement surfaces into new aggregates. The aggregates and oxidized asphalt are processed and combined with fresh or "virgin" ingredients and this mixture is then applied to form the newly resurfaced roadway. During the process of recycling, the asphalt in the existing roadway is oxidized such that, when incorporated into new road surface, the quality and durability are often poor or unacceptable. To counteract this oxidation an asphalt additive (rejuvenator), asphalt emulsions, or foamed asphalt are often used during the process. While the following discussion of the general inventive concepts relates mainly to hot-in-place recycling, those of ordinary skill in the art will recognize that the embodiments discussed herein are also applicable to other asphalt recycling processes, including, but not limited to cold-in-place, cold central plant, warm mix asphalt, hot mix asphalt, and cold mix asphalt (cold patch), among others.

Products that include 100% rejuvenator soften all-ready present RAP binder but do not add new binder to the mixture. Rejuvenator products based on emulsions contain high amounts of water which is not desirable for the hot-in-place process. Hydrocarbon based process oils or lube oil type materials are useful but often prove cost-prohibitive.

The general inventive concepts are based on the discovery that a blend of bio-based rejuvenator product and soft asphalt flux combines the rejuvenating effects of a bio-oil rejuvenator with the "stickiness" or tackiness of asphalt resulting in a storage stable liquid at ambient temperatures and increased performance (reduced cracking) of the resultant hot mix asphalt (HMA) surface. This asphalt rejuvenator formulation gives a soft asphalt that will be combined with RAP that goes through the hot-in-place asphalt recycling process. The rejuvenator activates the oxidized asphalt to provide a product formulation that is flowable at room temperature. In certain embodiments, this has the added benefit that a heated tank or plant is not required to maintain the desired viscosity/flowability of the asphalt additive or asphalt recycling agent.

In certain exemplary embodiments, the general inventive concepts contemplate a novel formulation that combines a conventional rejuvenator with "virgin" asphalt flux. Such a formulation (re)activates the oxidized/recycled asphalt binder and forms a product that is flowable at room temperature (e.g., approximately 70° F.). The addition of the asphalt flux provides added tackiness relative to formulations comprising rejuvenator alone. In certain embodiments, the rejuvenator is a bio-based rejuvenator. Suitable bio-based rejuvenators include, but are not limited to: corn-oil based, soy based, and modified vegetable oil-based rejuvenators. One particularly suitable bio-based rejuvenator is the "Jive" corn-oil based rejuvenator, sold by Poet Biorefining.

In certain exemplary embodiments, the general inventive concepts contemplate a hot-in-place asphalt formulation comprising a modified rejuvenator which includes a blend of 50-80% asphalt rejuvenator and 20-50% asphalt flux. In certain exemplary embodiments, the modified rejuvenator comprises a blend of 50-75% asphalt rejuvenator and 25-50% asphalt flux. In certain exemplary embodiments, the modified rejuvenator comprises a blend of 50-70% asphalt rejuvenator and 30-50% asphalt flux. In certain exemplary embodiments, the modified rejuvenator comprises a blend of 50-65% asphalt rejuvenator and 35-50% asphalt flux. In certain exemplary embodiments, the modified rejuvenator comprises a blend of 50-60% asphalt rejuvenator and 40-50% asphalt flux. In certain exemplary embodiments, the modified rejuvenator comprises a blend of 55-80% asphalt rejuvenator and 20-45% asphalt flux. In certain exemplary embodiments, the modified rejuvenator comprises a blend of 60-80% asphalt rejuvenator and 20-40% asphalt flux. In certain exemplary embodiments, the modified rejuvenator comprises a blend of 65-80% asphalt rejuvenator and 20-35% asphalt flux. In certain exemplary embodiments, the modified rejuvenator comprises a blend of 70-80% asphalt rejuvenator and 20-30% asphalt flux.

In certain exemplary embodiments, the general inventive concepts contemplate a hot-in-place asphalt formulation that comprises a modified rejuvenator and recycled asphalt pavement. In certain exemplary embodiments, the modified rejuvenator is mixed with the recycled asphalt pavement in a weight percent of from about 3% to about 8%. In certain exemplary embodiments, the modified rejuvenator is mixed with the recycled asphalt pavement in a weight percent of from about 3% to about 7%. In certain exemplary embodiments, the modified rejuvenator is mixed with the recycled asphalt pavement in a weight percent of from about 3% to about 6%. In certain exemplary embodiments, the modified rejuvenator is mixed with the recycled asphalt pavement in a weight percent of from about 4% to about 8%. In certain exemplary embodiments, the modified rejuvenator is mixed with the recycled asphalt pavement in a weight percent of from about 4% to about 7%. In certain exemplary embodiments, the modified rejuvenator is mixed with the recycled asphalt pavement in a weight percent of from about 4% to about 6%.

In certain exemplary embodiments, the general inventive concepts contemplate a method of resurfacing a roadway. The method comprises mixing a bio-based asphalt rejuvenator in an amount of 50-80% by weight with virgin asphalt flux in an amount of 20-50% by weight, to form a modified rejuvenator; acquiring recycled asphalt pavement; mixing the modified rejuvenator with the recycled asphalt pavement; and contacting the roadway with the mixture formed from the recycled asphalt pavement and modified rejuvenator. In certain exemplary embodiments, the modified rejuvenator is mixed with the recycled asphalt pavement in a weight percent of from about 3% to about 8%. In certain exemplary embodiments, the modified rejuvenator is mixed with the recycled asphalt pavement in a weight percent of from about 3% to about 7%. In certain exemplary embodiments, the modified rejuvenator is mixed with the recycled asphalt pavement in a weight percent of from about 3% to about 6%. In certain exemplary embodiments, the modified rejuvenator is mixed with the recycled asphalt pavement in a weight percent of from about 4% to about 8%. In certain exemplary embodiments, the modified rejuvenator is mixed with the recycled asphalt pavement in a weight percent of from about 4% to about 7%. In certain exemplary embodiments, the modified rejuvenator is mixed with the recycled asphalt pavement in a weight percent of from about 4% to about 6%. In certain exemplary embodiments, the modified rejuvenator is utilized in an amount of about 0.085 gallons per square yard of roadway.

While not wishing to be bound by theory, it is believed that the particular mixture of a soft asphalt flux and a bio-based rejuvenator in amounts according to the general inventive concepts provides more effective room temperature flowability and (even so-called "cold-in-place" use) than conventional systems. This has the dual benefits of reducing the energy required to process the RAP mixture for resurfacing and increases the temperature range under which hot-in-place recycling can be performed. The improved flowability also may reduce the equipment necessary for HMA as a separate heating plant may not be required.

The general inventive concepts contemplate a variety of uses for the asphalt formulations or rejuvenators disclosed herein. For example, the formulations/rejuvenators can be applied to paved surfaces, road surfaces and subsurfaces, shoulders, bridges, bridge abutments, gravel substitutes for unpaved roads, and the like. In one aspect, the invention relates to a paved surface comprising an asphalt rejuvenator composition.

The following examples are provided merely for illustrative purposes, those of skill in the art will recognize many variations that are within the spirit of the invention, limited only by the scope of the claims.

EXAMPLES

An exemplary formulation, referred to herein as Example 1, has the following rotational viscosities shown in Table 1. The formulation comprises a mixture of 50% of a bio-based rejuvenator and 50% of asphalt flux.

TABLE 1

| Conditions | Rotational Viscosity (Pa's) |
|---|---|
| 30° C./86° F. | 0.508 |
| 40° C./104° F. | 0.280 |
| 50° C./122° F. | 0.168 |
| 60° C./140° F. | 0.108 |

The exemplary formulation of Example 1 was measured for shear viscosity using a dynamic shear rheometer according to ASTM D7175-15. The results are shown in Table 2.

TABLE 2

| Conditions | Value (KPa, °) |
|---|---|
| 6° C. | 0.011, 82.6 |
| 0° C. | 0.013, 84.8 |
| −4° C. | 0.018, 86.1 |

The exemplary formulation of Example 1 was measured for density according to ASTM D1475-13 ASTM D7175-15. The results are shown in Table 3.

TABLE 3

| Conditions | Value |
|---|---|
| WPG 60° F. | 7.350-7.950 |
| SPGR 60° F. | 0.8800-0.9700 |

For comparison, the virgin asphalt flux employed in Example 1 has the properties shown in Table 4:

TABLE 4

| | |
|---|---|
| Softening Point (° F.) | 109 |
| Penetration 77° F. (dmm): | 167 |
| Penetration 32° F. (dmm): | |
| Absolute Viscosity 140° F. (Poise): | 639 |
| ODSR 52° C. (kPa, °): | 1.90, 86.1 |
| ODSR 58° C. (kPa, °): | 0.85, 87.5 |
| ODSR Grade: | 56.8 |
| Rotational Viscosity 122° F./50° C. (cP): | 318,000 |

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The asphalt compositions, and corresponding methods of the present disclosure can comprise, consist of, or consist essentially of the essential elements and limitations of the disclosure as described herein, as well as any additional or optional ingredients, components, or limitations described herein or otherwise useful in asphalt composition applications.

The asphalt compositions of the present disclosure may also be substantially free of any optional or selected ingredient or feature described herein, provided that the remaining composition still contains all of the required elements or features as described herein. In this context, and unless otherwise specified, the term "substantially free" means that the selected composition contains less than a functional amount of the optional ingredient, typically less than 0.1% by weight, and also including zero percent by weight of such optional or selected essential ingredient.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

While the general inventive concepts have been illustrated and described in detail in the foregoing description, the same is to be considered as illustrative and not restrictive in character. It should be understood that only the exemplary embodiments have been shown and described and that all changes and modifications that come within the spirit of the invention are desired to be protected.

The invention claimed is:

1. A modified asphalt rejuvenator for hot-in-place asphalt recycling, the modified rejuvenator comprising a blend of 50-80% asphalt rejuvenator and 20-50% asphalt flux.

2. The modified asphalt rejuvenator of claim 1, wherein the asphalt rejuvenator is a bio-based rejuvenator.

3. The modified asphalt rejuvenator of claim 1, wherein the asphalt rejuvenator is a corn-oil based rejuvenator.

4. A hot-in-place asphalt formulation comprising:
   a modified rejuvenator and recycled asphalt pavement,
   the modified rejuvenator comprising: a blend of 50-80% asphalt rejuvenator and 20-50% asphalt flux.

5. The hot-in-place asphalt formulation of claim 4, wherein the modified rejuvenator is present in an amount of 3% to 8% by weight of the hot-in-place asphalt formulation.

6. The hot-in-place asphalt formulation of claim 4, wherein the asphalt rejuvenator is a bio-based rejuvenator.

7. The hot-in-place asphalt formulation of claim 4, wherein the asphalt rejuvenator is a corn-oil based rejuvenator.

8. The hot-in-place asphalt formulation of claim 4, wherein the modified rejuvenator is present in an amount of about 0.085 gallons per square yard of roadway.

9. A method of resurfacing a roadway comprising:
   mixing a bio-based asphalt rejuvenator in an amount of 50-80% by weight with a virgin asphalt flux in an amount of 20-50% by weight to form a modified rejuvenator,
   acquiring recycled asphalt pavement,
   mixing the modified rejuvenator with the recycled asphalt pavement, and
   contacting the roadway with the mixture formed from the modified rejuvenator and recycled asphalt pavement.

10. The method of claim 9, wherein the modified rejuvenator is present in an amount of 3% to 8% by weight of the hot-in-place asphalt formulation.

11. The method of claim 9, wherein the asphalt rejuvenator is a bio-based rejuvenator.

12. The method of claim 9, wherein the asphalt rejuvenator is a corn-oil based rejuvenator.

13. The method of claim 9, wherein the modified rejuvenator is utilized in an amount of about 0.085 gallons per square yard of roadway.

* * * * *